(12) United States Patent
Kashid et al.

(10) Patent No.: US 11,841,084 B2
(45) Date of Patent: Dec. 12, 2023

(54) VALVE SPOOL WITH FLOW FORCE MITIGATION FEATURES

(71) Applicant: Parker-Hannifin Corporation, Cleveland, OH (US)

(72) Inventors: Bipin G. Kashid, Strongsville, OH (US); Micheal E. Harman, Bryan, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 414 days.

(21) Appl. No.: 17/143,305

(22) Filed: Jan. 7, 2021

(65) Prior Publication Data

US 2021/0310570 A1 Oct. 7, 2021

Related U.S. Application Data (60) Provisional application No. 63/005,536, filed on Apr. 6, 2020.

(51) Int. Cl.
*F16K 11/07* (2006.01)
*F15B 13/04* (2006.01)

(52) U.S. Cl.
CPC ...... *F16K 11/0708* (2013.01); *F15B 13/0402* (2013.01)

(58) Field of Classification Search
CPC .............. F16K 11/0708; F15B 13/0402; F15B 2013/008; F15B 2211/40507;

(Continued)

(56) References Cited

U.S. PATENT DOCUMENTS 4,245,816 A 1/1981 Johnson
4,526,000 A 7/1985 Saurwein
(Continued)

FOREIGN PATENT DOCUMENTS

CN 201753715 U 3/2011
DE 102014209277 A1 11/2015
(Continued)

OTHER PUBLICATIONS

Extended European Search Report prepared by the European Patent Office in application No. EP 21 16 5238.3 dated Jul. 29, 2021.
(Continued)

*Primary Examiner* — Patrick C Williams
(74) *Attorney, Agent, or Firm* — McDonnell Boehnen Hulbert & Berghoff LLP (57) ABSTRACT

An example spool includes a spool body varying in diameter along a length of the spool body, thereby forming a plurality of lands of variable diameters, wherein a land of the plurality of lands is configured to control fluid flow from a workport passage formed in a valve worksection to a return cavity; and a plurality of axial grooves formed in a circular array about a circumference of the land, wherein the plurality of axial grooves comprises a first set of axial grooves and a second set of axial grooves, wherein an axial length of axial grooves of the second set of axial grooves is greater than a respective axial length of axial grooves of the first set of axial grooves, allowing the axial grooves of the second set of axial grooves to engage the return cavity before the axial grooves of the first set of axial grooves.

15 Claims, 8 Drawing Sheets

(58) Field of Classification Search
CPC .... F15B 2211/41527; F15B 2211/5153; F15B 2211/555; F15B 2211/8609; F15B 2211/8613
See application file for complete search history.

(56) References Cited

U.S. PATENT DOCUMENTS

| | | |
|---|---|---|
| 6,076,552 A | 6/2000 | Takahsahi et al. |
| 6,397,890 B1 | 6/2002 | Mickelson et al. |
| 2013/0153068 A1* | 6/2013 | West ............... F16K 11/0708 137/625.69 |

FOREIGN PATENT DOCUMENTS

| | | |
|---|---|---|
| EP | 0 015 955 A1 | 10/1980 |
| EP | 0 701 789 A1 | 5/1996 |
| WO | WO 2018/206316 A1 | 11/2018 |

OTHER PUBLICATIONS

Examination Report prepared by the European Patent Office in European application No. 21 165 238.3 dated Aug. 3, 2023.

* cited by examiner

Proximal Direction                    Distal Direction

1102 — POSITIONING A SPOOL IN A NEUTRAL POSITION WITHIN A LONGITUDINAL BORE FORMED IN A WORKSECTION OF A VALVE ASSEMBLY, WHEREIN THE WORKSECTION COMPRISES A WORKPORT PASSAGE FLUIDLY COUPLED TO A HYDRAULIC ACTUATOR AND A RETURN CAVITY FLUIDLY COUPLED TO A FLUID RESERVOIR, WHEREIN THE SPOOL HAS A LAND CONFIGURED TO CONTROL FLUID FLOW FROM A WORKPORT PASSAGE TO A RETURN CAVITY, WHEREIN THE LAND COMPRISES A PLURALITY OF AXIAL GROOVES FORMED IN A CIRCULAR ARRAY ABOUT A CIRCUMFERENCE OF THE LAND, WHEREIN THE PLURALITY OF AXIAL GROOVES COMPRISES A FIRST SET OF AXIAL GROOVES AND A SECOND SET OF AXIAL GROOVES, WHEREIN AN AXIAL LENGTH OF AXIAL GROOVES OF THE SECOND SET OF AXIAL GROOVES IS GREATER THAN A RESPECTIVE AXIAL LENGTH OF AXIAL GROOVES OF THE FIRST SET OF AXIAL GROOVES, AND WHEREIN IN THE NEUTRAL POSITION OF THE SPOOL, THE PLURALITY OF AXIAL GROOVES ARE DISENGAGED FROM THE RETURN CAVITY, AND THE LAND FLUIDLY DECOUPLES THE WORKPORT PASSAGE FROM THE RETURN CAVITY

1104 — MOVING THE SPOOL TO A FIRST AXIAL POSITION, WHEREIN AT THE FIRST AXIAL POSITION OF THE SPOOL, THE AXIAL GROOVES OF THE SECOND SET OF AXIAL GROOVES ENGAGE THE RETURN CAVITY, THEREBY FLUIDLY COUPLING THE WORKPORT PASSAGE TO THE RETURN CAVITY, WHEREAS THE AXIAL GROOVES OF THE FIRST SET OF AXIAL GROOVES REMAIN DISENGAGED FROM THE RETURN CAVITY

1106 — MOVING THE SPOOL TO A SECOND AXIAL POSITION, WHEREIN AT THE SECOND AXIAL POSITION OF THE SPOOL, THE AXIAL GROOVES OF THE FIRST SET OF AXIAL GROOVES ENGAGE THE RETURN CAVITY SUCH THAT BOTH THE FIRST SET OF AXIAL GROOVES AND THE SECOND SET OF AXIAL GROOVES FLUIDLY COUPLE THE WORKPORT PASSAGE TO THE RETURN CAVITY

FIG. 11

VALVE SPOOL WITH FLOW FORCE MITIGATION FEATURES

CROSS REFERENCE TO RELATED APPLICATION

The present application claims priority to U.S. Provisional patent application No. 63/005,536 filed on Apr. 6, 2020, and entitled "Valve Spool with Flow Force Mitigation Features," the entire contents of which are herein incorporated by reference as if fully set forth in this description.

BACKGROUND

Hydraulic machinery commonly includes one or more valves, which can include directional control valves. The valve can include a spool that is operated in response to the input command to control fluid flow and pressure to a hydraulic actuator of the machinery. The hydraulic actuator can have two chambers, and the main flow control valve can control fluid flow from a source of fluid to one chamber of the hydraulic actuator as well as fluid flow from the other chamber of the actuator to a fluid reservoir.

When the valve is actuated, the spool can shift or move axially within a bore in a valve body of the valve. As the spool moves, a spool variable area orifice is formed. A cross-sectional area such variable area orifice depends on the extent of axial motion of the spool. For example, when the spool shifts in a given direction, fluid can be allowed to flow from the actuator, then around the spool to a return cavity that is fluidly coupled to the fluid reservoir.

When the spool moves a small axial distance causing a small opening, as fluid flows about the spool, Bernoulli flow forces can be generated. The flow forces oppose the actuation force applied to the spool to shift it within the bore. As a consequence, the valve might not operate as expected, and instabilities might occur as pressure levels fluctuate. Such instabilities can be propagated to the machinery controlled by the valve.

It may thus be desirable to have a spool configured to mitigate the effect of flow forces and enhance stability of the valve. It is with respect to these and other considerations that the disclosure made herein is presented.

SUMMARY

The present disclosure describes implementations that relate to a valve spool with flow force mitigation features.

In a first example implementation, the present disclosure describes a spool configured to be movable in a worksection of a valve assembly. The spool includes: (i) a spool body varying in diameter along a length of the spool body, thereby forming a plurality of lands of variable diameters, wherein a land of the plurality of lands is configured to control fluid flow from a workport passage formed in the worksection to a return cavity formed in the worksection; and (ii) a plurality of axial grooves formed in a circular array about a circumference of the land, wherein the plurality of axial grooves comprises a first set of axial grooves and a second set of axial grooves, wherein an axial length of axial grooves of the second set of axial grooves is greater than a respective axial length of axial grooves of the first set of axial grooves, allowing the axial grooves of the second set of axial grooves to engage the return cavity before the axial grooves of the first set of axial grooves when the spool is shifted within the worksection in a distal axial direction.

In a second example implementation, the present disclosure describes a worksection of a valve assembly. The worksection includes: (i) a worksection body having (a) a longitudinal bore, (b) a workport passage configured to be fluidly coupled to a hydraulic actuator, and (c) a return cavity configured to be fluidly coupled to a fluid reservoir; and (ii) a spool axially movable in the longitudinal bore to shift from a neutral position to a first axial position and a second axial position. The spool comprises: (i) a spool body varying in diameter along a length of the spool body, thereby form a plurality of lands of variable diameters, wherein a land of the plurality of lands is configured to control fluid flow from the workport passage to the return cavity, wherein the land fluidly decouples the workport passage from the return cavity when the spool is in the neutral position, and (ii) a plurality of axial grooves formed in a circular array about a circumference of the land, wherein the plurality of axial grooves comprises a first set of axial grooves and a second set of axial grooves, wherein an axial length of axial grooves of the second set of axial grooves is greater than a respective axial length of axial grooves of the first set of axial grooves, allowing the axial grooves of the second set of axial grooves to engage the return cavity to fluidly couple the workport passage to the return cavity while the axial grooves of the first set of axial grooves remain disengaged from the return cavity when the spool is shifted to the first axial position, and wherein at the second axial position of the spool, both the first set of axial grooves and the second set of axial grooves fluidly couple the workport passage to the return cavity.

In a third example implementation, the present disclosure describes a hydraulic system. The hydraulic system includes: a fluid reservoir; a hydraulic actuator having a chamber therein; and a valve assembly comprising a worksection controlling fluid flow to and from the chamber of the hydraulic actuator. The worksection comprises: a worksection body having: (i) a longitudinal bore, (ii) a workport passage fluidly coupled to the chamber of the hydraulic actuator, and (iii) a return cavity fluidly coupled to the fluid reservoir; and a spool axially movable in the longitudinal bore to shift in a distal direction from a neutral position to a first axial position and a second axial position. The spool comprises: (i) a spool body varying in diameter along a length of the spool body, thereby form a plurality of lands of variable diameters, wherein a land of the plurality of lands controls fluid flow from the workport passage to the return cavity, wherein the land fluidly decouples the workport passage from the return cavity when the spool is in the neutral position; and (ii) a plurality of axial grooves formed in a circular array about a circumference of the land, wherein the plurality of axial grooves comprises a first set of axial grooves and a second set of axial grooves, wherein an axial length of axial grooves of the second set of axial grooves is greater than a respective axial length of axial grooves of the first set of axial grooves, allowing the axial grooves of the second set of axial grooves to engage the return cavity to fluidly couple the workport passage to the return cavity while the axial grooves of the first set of axial grooves remain disengaged from the return cavity when the spool is shifted to the first axial position, and wherein at the second axial position of the spool, both the first set of axial grooves and the second set of axial grooves fluidly couple the workport passage to the return cavity.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 11 is a flowchart of a method for operating a worksection of a valve assembly, in accordance with an example implementation.

DETAILED DESCRIPTION

In certain applications, hydraulic fluid flow in a hydraulic machine can be controlled using hydraulic sectional control valves. A sectional control valve or valve assembly can include a plurality of separate cast and machined metal valve worksections. Each worksection may include internal fluid passages, external ports, and valve bores with valve members slidably disposed within each valve bore. The valve bores may include a spool bore in which a main spool is slidably accommodated. Each worksection may be configured to control flow of fluid to and from a hydraulic actuator of the hydraulic machine.

Particularly, when the valve is actuated and the spool shifts within the spool bore, a variable orifice is formed that allows fluid flow therethrough, e.g., from the hydraulic actuator through a workport in the valve, then through the variable orifice to a return cavity connected to a fluid reservoir. Bernoulli flow forces can result as fluid flows through the variable orifice.

The flow forces can have an axial component that acts on the spool in a closing direction opposing the opening force applied to the spool. In some cases, the flow forces are sufficiently high that instabilities and pressure fluctuations might occur and propagate to the hydraulic actuator and the hydraulic machine. It may thus be desirable to have a spool configured to reduce or mitigate such flow forces and their effect on operation of the valve.

Disclosed herein are spools, systems, valve sections, and valve assemblies that mitigate the effect of flow forces. Particularly, an example spool is configured to have axial grooves that sequentially fluidly couple a workport passage to a return cavity to avoid a sudden, step-wise increase in flow rate and flow forces acting on the spool. In an example, the axial grooves can have variable depths. For instance, the axial grooves that first fluidly couple the workport passage to the return cavity can be shallower than axial grooves that subsequently fluidly couple the workport passage to the return cavity. In another example, each axial groove can have a first portion that is concave and has a first depth and a second portion that is concave and has a second depth, and the first portion is separated from the second portion by a convex or flat portion operating as a restriction that enhances stability of the valve.

Figure 1:
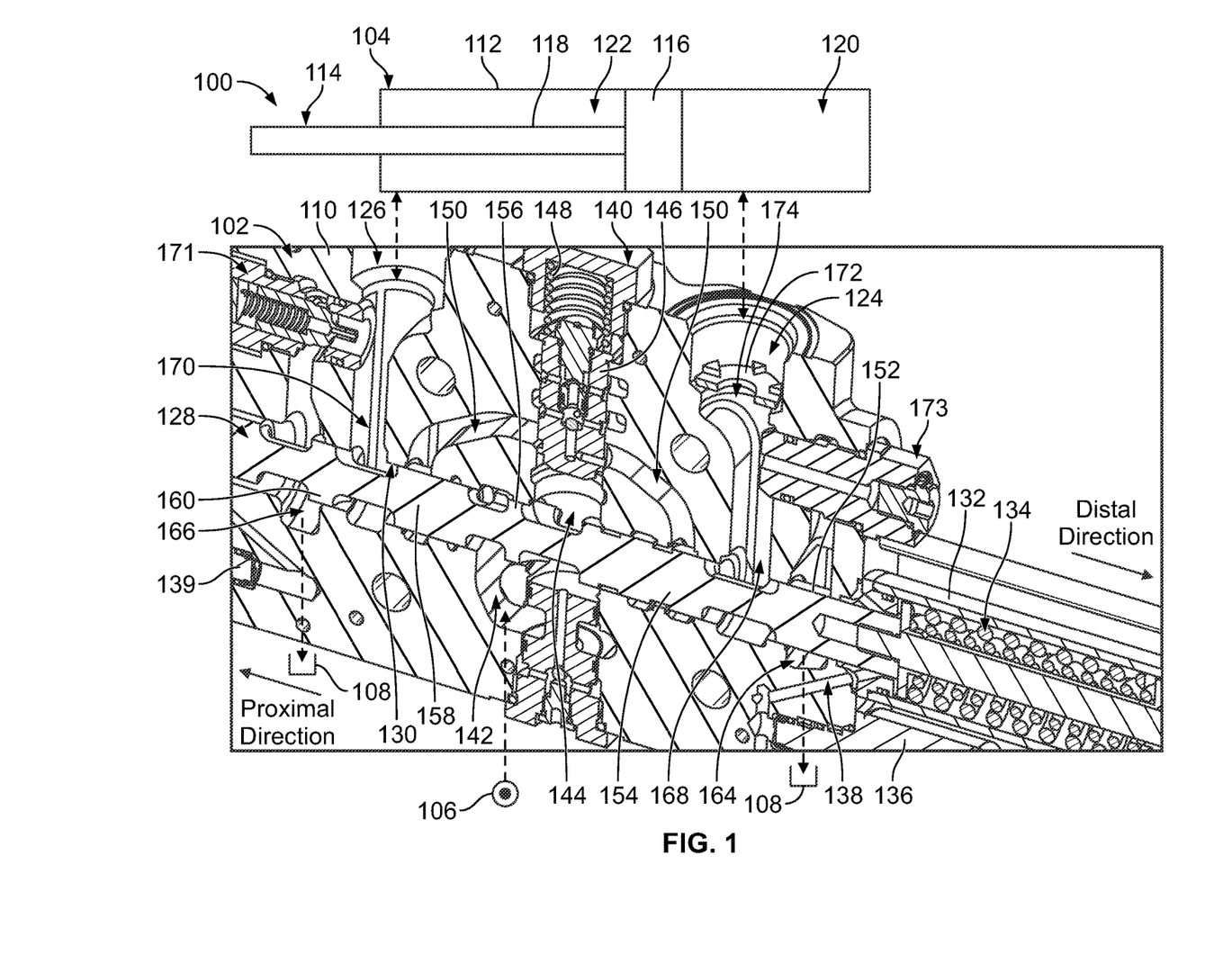
FIG. 1 illustrates a partial, schematic representation of a hydraulic system, in accordance with an example implementation.

FIG. 1 illustrates a partial, schematic representation of a hydraulic system 100, in accordance with an example implementation. FIG. 1 particularly illustrates a perspective cross-sectional view of a worksection 102 of a valve assembly that is configured to control multiple hydraulic actuators of the hydraulic system 100. For example, the hydraulic system 100 can include a hydraulic actuator 104, and the worksection 102 is configured to control fluid flow to and from the hydraulic actuator 104.

The valve assembly can have an inlet section, a plurality of worksections such as the worksection 102, and an outlet section. The worksections can be positioned adjacent one another and can be interposed between the inlet section and the outlet section. The inlet section, the worksections, and the outlet section can be coupled together by fasteners (e.g., bolts screws, clamps, tie rods, etc.) to provide an assembly of valve sections.

The hydraulic system 100 can include a source 106 of fluid. The source 106 of fluid can be a pump (e.g., fixed displacement, variable displacement pump, a load-sense variable displacement pump, etc.), for example. The pump can receive fluid from a fluid tank or fluid reservoir 108 of the hydraulic system 100, and the source 106 pump then provides fluid flow to the valve assembly.

Particularly, the source 106 can be fluidly coupled to an inlet port disposed in an inlet section of the valve assembly. The valve assembly includes fluid passages that can then provide the fluid from the source 106 to the worksections of the valve assembly including the worksection 102. The fluid reservoir 108 can be fluidly coupled to a reservoir port that can be disposed in the inlet section or an outlet section of the valve assembly.

The worksection 102 has a worksection body 110 that defines multiple fluid passages, cavities, and bores therein. The worksection 102 also includes workports that are configured to be fluidly coupled to respective chambers of the hydraulic actuator 104.

For example, the hydraulic actuator 104 can include a cylinder 112 and a piston 114 slidably accommodated within the cylinder 112. The term "slidably accommodated" is used throughout herein to indicate that a first component (e.g., the piston 114) is positioned relative to a second component (e.g., the cylinder 112) such that the first component is able to move relative to the second component.

The piston 114 includes a piston head 116 and a piston rod 118 extending from the piston head 116 along a central longitudinal axis direction of the cylinder 112. The piston head 116 divides the inside or internal space of the cylinder 112 into a chamber 120 and a chamber 122. The chamber 120 can be referred to as a cap chamber or head chamber, whereas the chamber 122 can be referred to as a rod chamber.

The worksection 102 includes a workport 124 that is fluidly coupled (e.g., via a fluid lines such as a hose) to the chamber 120 of the hydraulic actuator 104 and includes a workport 126 that is fluidly coupled to the chamber 122 of the hydraulic actuator 104. The worksection 102 is configured to control supply fluid flow from the source 106 to the workports 124, 126 and control return fluid flow from the workports 124, 126 to the fluid reservoir 108.

The worksection 102 has a spool 128 slidably accommodated (i.e., axially movable) in a longitudinal bore 130 formed in the worksection body 110. The spool 128 can be configured to be biased to a neutral or centered position by springs disposed in end caps at the distal and proximal ends of the spool 128. For example, as shown in FIG. 1, the worksection 102 can include an end cap 132 disposed at a distal end of the spool 128. The end cap 132 contains biasing springs 134 that bias the spool 128 in a proximal direction. The worksection 102 can similarly include another end cap (not shown) at a proximal end of the spool 128 configured to contain biasing springs that bias the spool 128 in a distal direction.

As such, the biasing springs on both ends of the spool 128 can bias the spool 128 to a neutral position at which the spool 128 can block fluid flow from the source 106 to the workports 124, 126. The term "block" is used throughout herein to indicate substantially preventing fluid flow except for minimal or leakage flow of drops per minute, for example.

The spool 128 can be actuated in either direction from the neutral position via various types of mechanisms. As an example for illustration, the spool 128 can be controlled by pilot valves such as pilot valve 136 that is partially shown in FIG. 1.

The pilot valve 136 can be solenoid-operated and can be used to actuate or move the spool 128 in the longitudinal bore 130. As an example, the pilot valve 136 can be configured as a pressure reducing valve that receives pressurized fluid from the source 106 then generates a pilot fluid signal that is proportional to a magnitude of an electric command provided thereto.

The pilot valve 136 can then provide the pilot fluid signal to a pilot fluid passage 138 that communicates the pilot fluid signal to the end cap 132. The pilot fluid signal can apply a fluid force on the spool 128 in the proximal direction to shift the spool 128 in the proximal direction. The worksection 102 can include another pilot valve 139 (a portion of which is shown in FIG. 1) at the proximal end of the spool 128 configured to shift the spool 128 in a distal direction when actuated.

In examples, the valve assembly can be configured to be a load-sense (LS) valve. Particularly, the valve assembly can have a shuttle valve network or system that resolves the highest load or the highest load-induced pressure level indicative of the highest load to which the actuators controlled by the valve assembly are subjected. The shuttle valve system then provides the LS signal indicative of the highest load to all the worksections of the valve assembly including the worksection 102.

Fluid provided from the source 106 is provided through the inlet section of the valve assembly and fluid passages to an inlet cavity 142 in the worksection 102. When the spool 128 moves axially in either direction, a variable metering orifice can be formed to allow fluid to flow from the inlet cavity 142 to a metered flow chamber 144.

The worksection 102 can have a pressure compensator valve 140 located downstream from the metered flow chamber 144. The pressure compensator valve 140 has a poppet 146 that is biased to a closed position by a compensator spring 148. The poppet 146 is subjected to various forces such as fluid forces from the LS signal indicative of the highest load to all the worksections of the valve assembly (i.e., a global LS signal), a local LS signal of the worksection 102, and pressurized fluid in the metered flow chamber 144 in addition to a spring force by the compensator spring 148.

The poppet 146 can then move based on equilibrium between the various forces to allow fluid flow from the metered flow chamber 144 to a regulated flow passage 150, which is looped as depicted in FIG. 1. With this configuration, the pressure compensator valve 140 is configured to maintain a predetermined pressure drop across a variable metering orifice formed when the spool 128 is moved axially regardless of the load experienced by the hydraulic actuator 104.

Although the worksection 102 used herein has a pressure-compensated, load-sensing configuration, the spool configurations described here that mitigate flow forces on the spools can be used with other types of valves, e.g., a non-pressure compensated valve, a non-load-sensing valve, open center valve, etc.

The spool 128 varies in diameter along its length to form lands of variable diameters capable of selectively interconnecting the various passages intercepting the longitudinal bore 130 to control flow of fluid to and from the workports 124, 126. The term "land" is used herein to indicate a generally cylindrical spool body portion. The lands of the spool 128 cooperate with internal surfaces of the worksection body 110 to define variable metering orifices that allows fluid flow therethrough. For example, the spool 128 has land 152, land 154, land 156, land 158, and land 160 configured to cooperate with the internal surfaces of the worksection body 110 to form the variable metering orifices and control the fluid flow rate and fluid direction through the worksection 102. The lands 152-160 can have a first diameter and are separated by lands having a second diameter that is smaller than the first diameter, such that annular grooves are formed between each two lands of the lands 150-162.

A variable metering orifice is used herein to indicate a spool-to-bore cylindrical area opening that forms between a land of the spool 128 and the internal surfaces of the worksection body 110 when the spool 128 shifts axially therein. Thus, the variable metering orifice is a flow area that forms between the spool 128 and the internal surface of the worksection body 110, and the flow area can vary in size based on the axial position of the spool 128 within the longitudinal bore 130, e.g., the farther the spool 128 shifts axially, the larger the flow area.

The worksection 102 has a return cavity 164 and a return cavity 166 that are fluidly coupled to the fluid reservoir 108. The fluid reservoir 108 is drawn in two locations on FIG. 1 to reduce visual clutter but it should be understood that that return cavities 164, 166 are connected through fluid passages in the valve assembly to an outlet port that is fluidly coupled to the fluid reservoir 108.

The worksection 102 has a workport passage 168 that is fluidly coupled to the workport 124. The worksection 102 also has a workport passage 170 that is fluidly coupled to the workport 126. The worksection 102 can include workport relief valves, such as workport relief valve 171 fluidly coupled to the workport passage 170, configured to relieve fluid if pressure level in the workport passage 170 exceeds a threshold pressure value. The worksection 102 can also include plugs, such as plug 173, if pressure level is not expected to increase beyond a threshold value, for example.

When the spool 128 is in a neutral position, fluid flow to the various chambers, cavities, and passages can be blocked. Particularly, the land 156 can block fluid flow from the inlet cavity 142 to the metered flow chamber 144, the land 154 blocks fluid flow from the regulated flow passage 150 to the workport passage 168, the land 158 blocks fluid flow from the regulated flow passage 150 to the workport passage 170, the land 152 blocks fluid flow from the workport passage 168 to the return cavity 164, and the land 160 blocks fluid flow from the workport passage 170 to the return cavity 166. As such, the piston 114 of the hydraulic actuator 104 might not move.

Actuating the pilot valve 136 or pilot valve 139 causes the spool 128 to move axially, thereby providing fluid flow to the hydraulic actuator 104 to move the piston 114. For instance, if the pilot valve 136 is actuated and the spool 128 shifts axially in the proximal direction, the land 156 can move in the proximal direction to the extent that it moves past an edge of the internal surface of the worksection body 110 interfacing therewith. As a result, a metering orifice is formed, allowing fluid flow from inlet cavity 142 to the metered flow chamber 144. Fluid in the metered flow chamber 144 can then push the poppet 146 and flow to the regulated flow passage 150.

Also, the land 154 moves past the edge of the internal surface of the worksection body 110, and another metering orifice is formed that allows fluid flow from the regulated flow passage 150 to the workport passage 168. The workport passage 168 is fluidly coupled to the workport 124, and thus fluid flows through the workport passage 168 to the workport 124, and then to the chamber 120 of the hydraulic actuator 104 to extend the piston 114 (e.g., move the piston 114 to the left in FIG. 1). Fluid discharged from the chamber 122 of the hydraulic actuator 104 flows through the workport 126 and the workport passage 170, then through another metering orifice formed between the land 160 and the internal surface of the worksection body 110 to the return cavity 166, which is fluidly coupled to the reservoir 108 as depicted in FIG. 1.

On the other hand, if the pilot valve 139 is actuated and the spool 128 shifts axially in the distal direction, the land 156 can move in the distal direction to the extent that it moves past an edge of the internal surface of the worksection body 110 interfacing therewith. As a result, a metering orifice is formed, allowing fluid flow from the inlet cavity 142 to the metered flow chamber 144. Fluid in the metered flow chamber 144 can then push the poppet 146 and flow to the regulated flow passage 150.

Also, the land 158 moves past the edge of the internal surface of the worksection body 110, and another metering orifice is formed, allowing fluid flow from the regulated flow passage 150 to the workport passage 170. The workport passage 170 is fluidly coupled to the workport 126, and thus fluid flows through the workport passage 170 to the workport 126, and then to the chamber 122 of the hydraulic actuator 104 to retract the piston 114 (e.g., move the piston 114 to the right in FIG. 1). Fluid discharged from the chamber 120 of the hydraulic actuator 104 flows through the workport 124 and the workport passage 168, then through another metering orifice formed between the land 152 and the internal surface of the worksection body 110 to the return cavity 164, which is fluidly coupled to the reservoir 108 as depicted in FIG. 1.

The fluid volume in the chamber 120 and the fluid flow rate of fluid discharged from the chamber 120 can be large in some applications. For instance, the hydraulic actuator 104 can represent one or two cylinders of a boom actuator of a wheel loader or skid steer, and as the boom actuator retracts, fluid is discharged from the cap or head chambers of the cylinders large at a large flow rate. The discharged fluid flows through the workport 124 and the workport passage 168, then through a metering orifice formed between the land 152 and the internal surfaces of the worksection body 110 to the return cavity 164.

Bernoulli flow forces can result from fluid flowing through the metering orifice formed between the land 152 and the internal surfaces of the worksection body 110 to the return cavity 164. The flow forces can have an axial component that acts on the spool 128 in a closing (proximal) direction opposing the opening force applied to the spool 128 (e.g., the force of the pilot fluid signal at the proximal end of the spool 128). In some cases, the flow forces are sufficiently high that they can cause oscillations of the spool 128 and oscillations in pressure levels can occur and propagate through the worksection 102 and the hydraulic actuator 104.

Such oscillations can cause instabilities in the hydraulic actuator 104 and the machine that the hydraulic actuator 104 controls. For example, such oscillations can cause the bucket of a wheel loader to oscillate as the boom actuator is retracting (e.g., as the piston 114 is retracting) to lower the bucket. Such oscillations and instabilities are undesirable.

It may thus be desirable to control (e.g., reduce or limit) fluid flow rate through the worksection 102 to reduce the flow forces and maintain stability. For example, the worksection 102 can include an orifice plate 172 disposed at the workport 124 and having a hole 174 formed therethrough. The hole 174 operates as a fixed orifice that limits fluid flow through the workport 124.

With this configuration, the orifice plate 172 can generate backpressure in the chamber 120 of the hydraulic actuator 104, which can prevent cavitation in the chamber 120 when the piston 114 is retracting at a high speed. The orifice plate 172 can also limit fluid flow rate of fluid discharged from the chamber 120 and flowing through the variable metering orifice formed by the land 152 and the internal surfaces of the worksection body 110. As a result, the flow forces generated and acting on the spool 128 may be reduced.

However, the orifice plate 172 can cause pressure level in the chamber 120 to increase, which may reduce efficiency of the hydraulic system. Also, as fluid flows through the hole 174, a pressure drop occurs (i.e., pressure level decreases as fluid flows therethrough such that pressure level in the chamber 120 is higher than pressure level in the workport passage 168). Such pressure drop causes power loss.

Particularly, power loss Pwr resulting from fluid flow through the hole 174 can be determined as $Pwr=Q(P_1-P_2)$, where Q is the flow rate through the hole 174, $P_1$ is pressure level in the chamber 120, and $P_2$ is pressure level in the workport passage 168. The higher the flow rate Q, the greater the power loss Pwr. The power loss is dissipated through the worksection 102 in the form of heat generated at the orifice plate 172. Such power loss may be undesirable as it reduces efficiency of the hydraulic system.

Further, when the spool 128 shifts in the other direction (in the proximal direction) to extend the piston 114 (e.g., to raise the bucket of the wheel loader by the boom actuators), fluid is provided through the workport passage 168, the orifice plate 172, the workport 124 to the chamber 120. The orifice plate 172 restricts fluid flow therethrough causing pressure levels to increase and efficiency to be reduced. In other words, while the orifice plate 172 may help reduce instabilities while lowering a load (retracting the piston 114), it can also reduce efficiency while raising the load (extending the piston 114).

It may thus be desirable to have a spool that is configured to reduce flow forces and instabilities while retracting the piston 114 without affecting extension of the piston 114. In particular, the land 152 of the spool 128 can be configured in a manner that controls fluid flow from the workport passage 168 to the return cavity 164 to reduce the flow forces. This way, the orifice plate 172 might be eliminated or the size of the hole 174 can be increased so as to enhance efficiency of the system. It may further be desirable that the configuration of the land 152 that restricts fluid flow from the workport passage 168 to the return cavity 164 does not affect operation of the worksection 102 while extending the piston 114.

Figure 2:
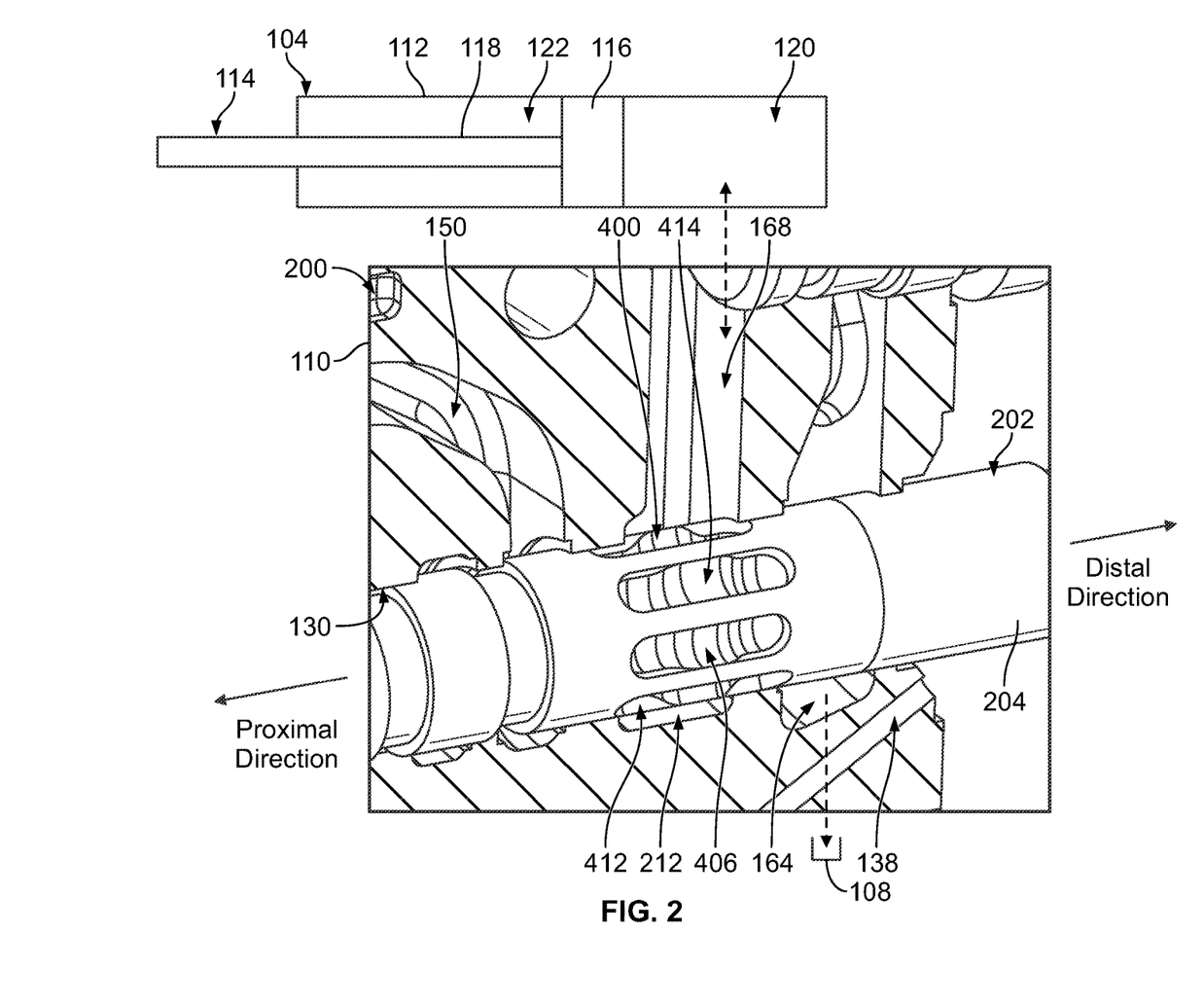
FIG. 2 illustrates a perspective cross-sectional view of a worksection of a valve assembly having a spool with flow force reduction features, in accordance with an example implementation.

FIG. 2 illustrates a perspective cross-sectional view of a worksection 200 of a valve assembly having a spool 202 with flow force reduction features, in accordance with an example implementation. The worksection 200 is similar to the worksection 102 and components that are the same in both worksections are designated with the same reference numbers. For example, the worksection body 110 can be configured similarly in both worksections. The spool 202, however, is different from the spool 128 in that the spool 202 has features that control fluid flow from the workport passage 168 to the return cavity 164 when retracting the piston 114 so as to reduce flow forces acting on the spool 202.

Figure 3:
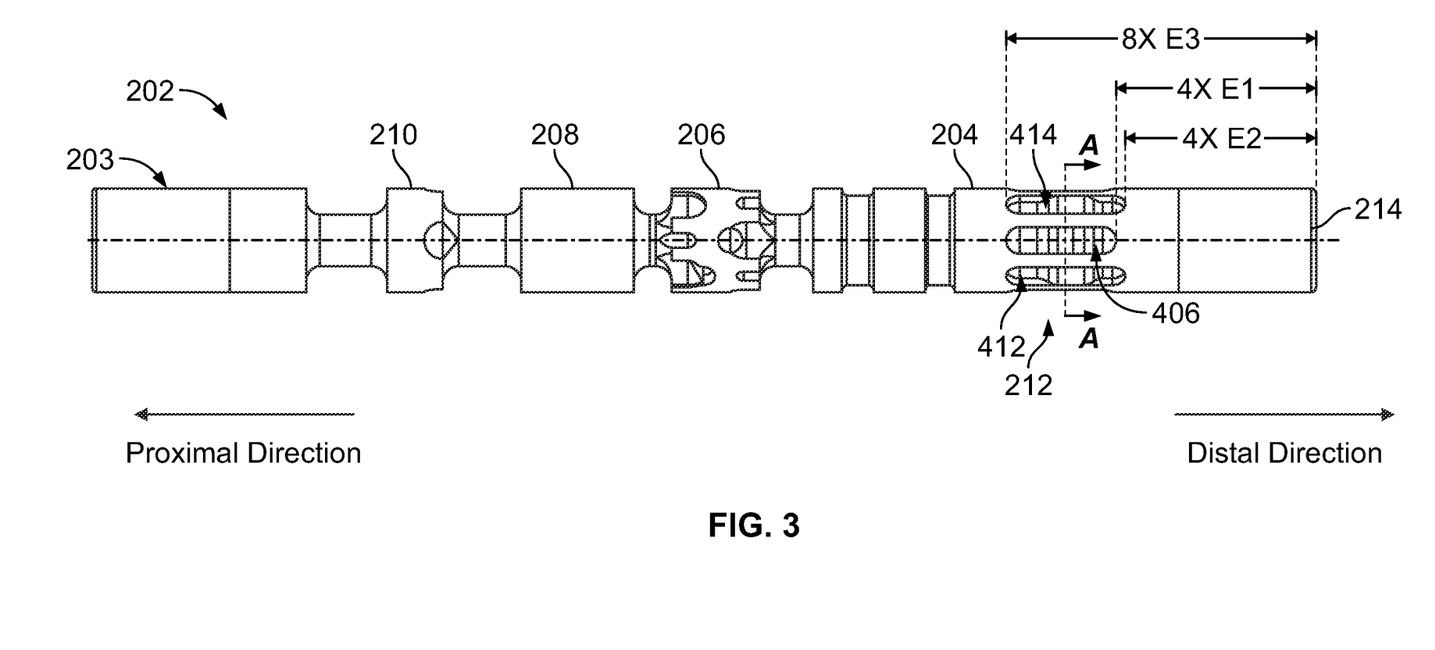
FIG. 3 illustrates a side view of a spool, in accordance with an example implementation.

FIG. 3 illustrates a side view of the spool 202, in accordance with an example implementation. The spool 202 has a spool body 203 that is generally cylindrical and varies in diameter along its length to form lands of variable diameters capable of selectively interconnecting the various passages intercepting the longitudinal bore 130 to control flow of fluid to and from the workports 124, 126.

Particularly, the lands of the spool 202 cooperate with internal surfaces of the worksection body 110 to define variable metering orifices that allows fluid flow therethrough. For example, the spool 202 comprises land 204 at its distal end configured to control fluid flow from the workport passage 168 to the return cavity 164 when the piston 114 is retracting and control fluid flow from the regulated flow passage 150 to the workport passage 168 when the piston 114 is extending.

The spool 202 also comprises land 206 configured to meter fluid flow from the inlet cavity 142 to the metered flow chamber 144. The spool 202 further includes land 208 configured to control fluid flow from the metered flow passage 150 to the workport passage 170 when the piston 114 is retracting, and land 210 configured to control fluid flow from the workport passage 170 to the return cavity 166 when the piston is extending. The lands 204-210 are configured as generally cylindrical portions of the spool body 203 and are separated by lands having a smaller diameter, such that annular grooves are formed therebetween, i.e., the lands 204-210 can have a first diameter and are separated by lands having a second diameter that is smaller than the first diameter, such that annular grooves are formed at the areas of the spool 202 having the smaller diameter lands.

To reduce the flow forces acting on the spool 202 when the piston 114 is retracting and a large amount of fluid flow is flowing from the chamber 120 to the fluid reservoir 108 via the worksection 200, the land 204 includes a plurality of axial grooves 212 that extend longitudinally along a portion of an axial length of the land 204. The plurality of axial grooves 212 are disposed in a circular array about a circumference of the land 204.

Figure 4:
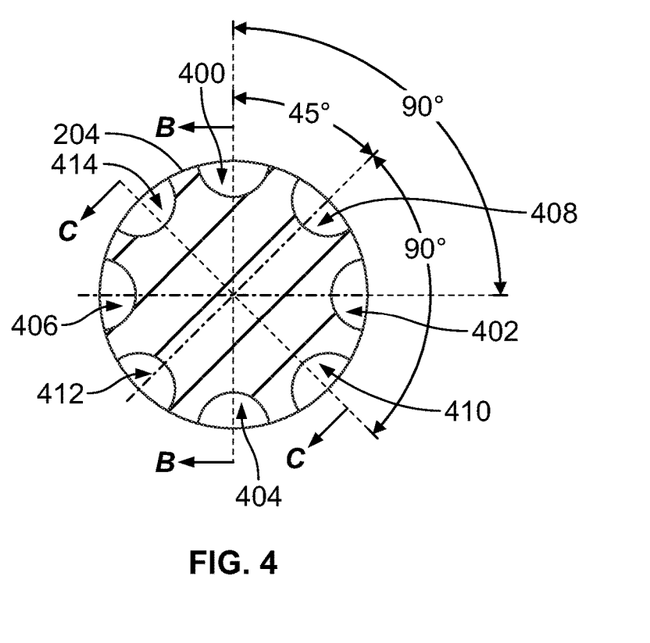
FIG. 4 illustrates a cross-sectional view labelled "A-A" in FIG. 3, in accordance with an example implementation.

FIG. 4 illustrates a cross-sectional view labelled "A-A" in FIG. 3, in accordance with an example implementation. As an example implementation shown in FIG. 4, the land 204 can include eight axial grooves that are disposed at 45 degree angles from each other about the circumference of the land 204. Eight axial grooves are used herein as an example; however, more or fewer axial grooves can be used based on the application.

The axial grooves can be configured differently. In particular, the land 204 can comprise a first set of axial grooves including axial groove 400, axial groove 402, axial groove 404, and axial groove 406. The axial grooves 400, 402, 404, and 406 can be configured similarly and are disposed at 90 degree angles from each other about the circumference of the land 204.

The land 204 also comprises a second set of axial grooves including axial groove 408, axial groove 410, axial groove 412, and axial groove 414 that can be configured similar to each other and are disposed at 90 degree angles from each other about the circumference of the land 204.

The axial grooves 400, 402, 404, and 406 of the first set of axial grooves are intermeshed or interleaved with the axial grooves 408, 410, 412, and 414 of the second first set of axial grooves. In other words, each of the axial grooves 400, 402, 404, and 406 is circumferentially-interposed between two axial grooves of the axial grooves 408, 410, 412, and 414 (i.e., the axial groove 400 is interposed between the axial grooves 414, 408; the axial groove 402 is interposed between the axial grooves 408, 410; the axial groove 404 is interposed between the axial grooves 410, 412; and the axial groove 406 is interposed between the axial grooves 412, 414).

Similarly, each of the axial grooves 408, 410, 412, and 414 is circumferentially-interposed between two axial grooves of the axial grooves 400, 402, 404, and 406 (i.e., the axial groove 408 is interposed between the axial grooves 400, 402; the axial groove 410 is interposed between the axial grooves 402, 404; the axial groove 412 is interposed between the axial grooves 404, 406; and the axial groove 414 is interposed between the axial grooves 406, 408). This configuration renders the spool 202 radially-balanced as fluid forces of fluid traversing the axial grooves applies equal radially-inward forces on the spool body 203.

The axial grooves of 408, 410, 412, and 414 of the second set of axial grooves are configured differently from the axial grooves 400, 402, 404, and 406 of the first set of axial grooves. Particularly, the first set of axial grooves have axial lengths that are different from respective axial lengths of the second set of axial grooves. Further, the first set of axial grooves can have depths that are different from respective depths of the second set of axial grooves.

Figure 5:
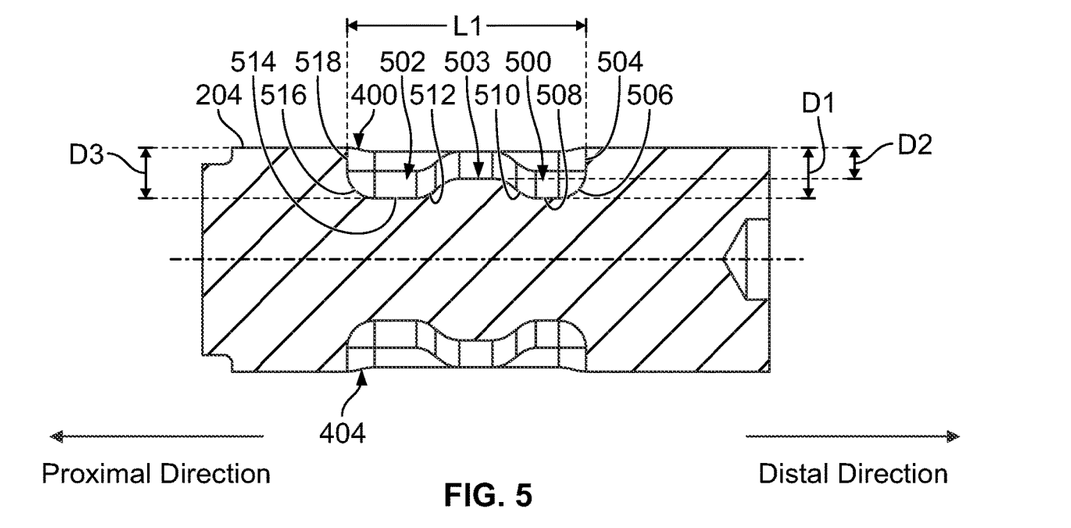
FIG. 5 illustrates a cross-sectional view labelled "B-B" in FIG. 4 depicting axial grooves of a first set of axial grooves, in accordance with an example implementation.

FIG. 5 illustrates a cross-sectional view labelled "B-B" in FIG. 4 depicting the axial groove 400 and the axial groove 404 of the first set of axial grooves, in accordance with an example implementation. The axial grooves 400, 404 are configured similar to each other and the axial grooves 402, 406 not shown in the cross-sectional view of FIG. 5 are similar to the axial grooves 400, 404.

The axial groove 400 can have an axial length L1 (i.e., the longitudinal distance from the distal edge of the axial groove 400 to the proximal edge of the axial groove 400). The axial groove 400 has a distal concave portion 500 and a proximal concave portion 502, that are separated from each other by a convex or straight portion, such as straight portion 503. The distal concave portion 500 and the proximal concave portion 502 can have concave of flat bases.

Tracing a contour of the axial groove 400 from its distal end to its proximal end, the distal concave portion 500 begins with a vertical plunge cut 504, followed by a curved portion 506, then a base or flat portion 508, then another curved portion 510. The curved portion 510 can include an inflection point of the distal concave portion 500 and turns into the straight portion 503.

The straight portion 503 operates as a "bump" between the distal concave portion 500 and the proximal concave portion 502 as the straight portion 503 is raised up from the deeper concave portions 500, 502. Continuing with tracing the profile of the axial groove 400, the straight portion 503 turns into or connects with a curved portion 512 of the proximal concave portion 502, which then turns into a base or flat portion 514, followed by a curved portion 516, which connects with a vertical plunge cut 518 at the proximal edge of the axial groove 400. The curved portions 510, 512 can instead be sloped straight surfaces.

Further, the distal concave portion 500 can have a depth D1 (i.e., a radial distance from the surface of the land 204 to the flat portion 508 is D1), the straight portion 503 can have a depth D2 (i.e., a radial distance from the surface of the land 204 to the straight portion 503 is D2), and the proximal concave portion 502 can have a depth D3 (i.e., a radial distance from the surface of the land 204 to the flat portion 514 is D3).

In examples, the depth D1 can be equal to the depth D3; however, in other examples, D1 and D3 can be different. As an example for illustration, the length L1 (longitudinal distance from the vertical plunge cut 504 and the vertical plunge cut 518) can be about 0.92 inches, the depths D1 and D3 can be about 0.3 inches, and the depth D2 can be about 0.225 inches. The axial groove 404 (as well as the axial grooves 402, 406 of the first set of axial grooves) is configured similar to the axial groove 400. However, the second set of axial grooves (the axial grooves 408, 410, 412, and 414) can be configured with different depths and lengths.

Figure 6:
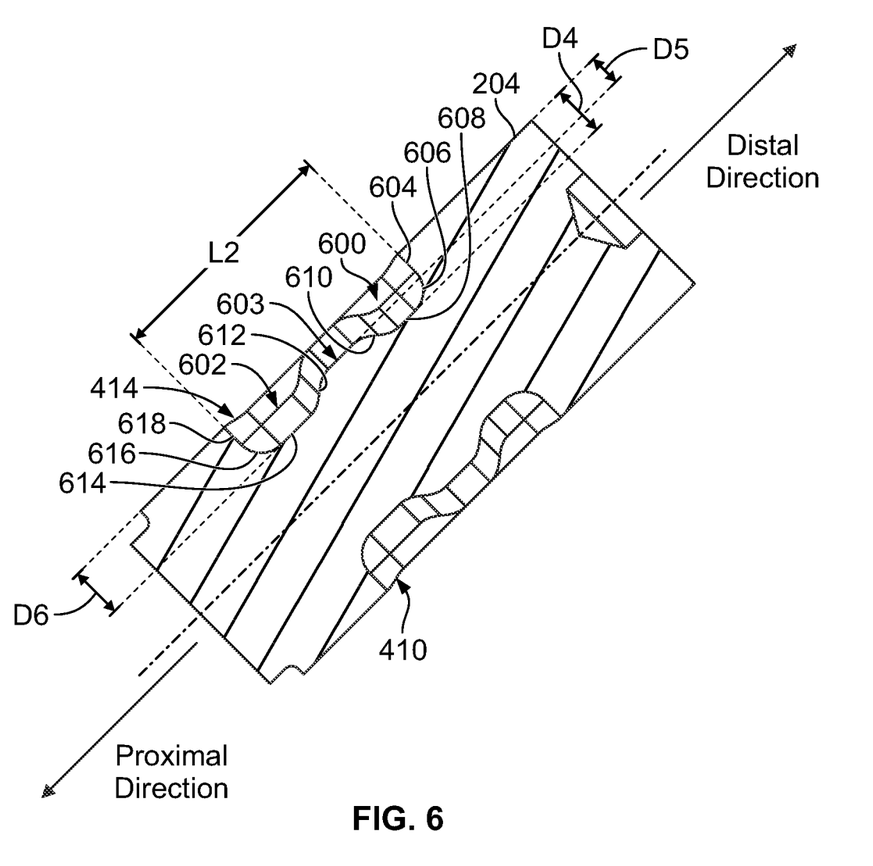
FIG. 6 illustrates a cross-sectional view labelled "C-C" in FIG. 4 depicting axial grooves of a second set of axial grooves, in accordance with an example implementation.

FIG. 6 illustrates a cross-sectional view labelled "C-C" in FIG. 4 depicting the axial groove 410 and the axial groove 414 of the second set of axial grooves, in accordance with an example implementation. The axial grooves 410, 414 are configured similar to each other and the axial grooves 408, 412 not shown in the cross-sectional view of FIG. 6 are similar to the axial grooves 410, 414.

The axial groove 414 can have an axial length L2 (i.e., the longitudinal distance from the distal edge of the axial groove 414 to the proximal edge of the axial groove 414). The axial groove 410 has a profile similar to the profile of the axial groove 400 described above. Particularly, the axial groove 410 has a distal concave portion 600 and a proximal concave portion 602, that are separated from each other by a convex or straight portion, such as straight portion 603. The distal concave portion 600 and the proximal concave portion 602 can have concave or flat bases.

For instance, tracing a contour of the axial groove 414 from its distal end to its proximal end, the distal concave portion 600 begins with a vertical plunge cut 604, followed by a curved portion 606, then a base or flat portion 608, then another curved portion 610. The curved portion 610 can include an inflection point of the distal concave portion 600 and turns into the straight portion 603.

The straight portion 603 operates as a "bump" between the distal concave portion 600 and the proximal concave portion 602. The straight portion 603 can then turn into or connects with a curved portion 612 of the proximal concave portion 602, then turns into a base or flat portion 614, followed by a curved portion 616, which connects with a vertical plunge cut 618. The curved portions 610, 612 can instead be sloped straight surfaces Further, the distal concave portion 600 can have a depth D4 (i.e., a radial distance from the surface of the land 204 to the flat portion 608 is D4), the straight portion 603 can have a depth D5 (i.e., a radial distance from the surface of the land 204 to the straight portion 603 is D5), and the proximal concave portion 602 can have a depth D6 (i.e., a radial distance from the surface of the land 204 to the flat portion 614 is D6).

In examples, the depth D4 can be equal to the depth D6; however, in other examples, D4 and D6 can be different. As an example for illustration, the length L2 (longitudinal distance from the vertical plunge cut 604 or distal end of the axial groove 414 and the vertical plunge cut 618 or proximal end of the axial groove 414) can be about 1.0 inch, the depths D4 and D6 can be about 0.2 inches, and the depth D5 can be about 0.125 inches. The axial groove 410 (as well as the axial grooves 408, 412) is configured similar to the axial groove 414.

As such, the axial length L2 of the second set of axial grooves (i.e., the axial grooves 408, 410, 412, and 414) can be greater than the respective axial length L1 of the first set of axial grooves (i.e., the axial grooves 400, 402, 404, and 406). Further, the depths (e.g., D4, D5, and/or D6) of the axial grooves 408, 410, 412, and 414 of the second set of axial grooves can be smaller than the respective depths (e.g., D1, D2, and/or D3) of the axial grooves 400, 402, 404, and 406 of the first set of axial grooves. In other words, the axial grooves 408, 410, 412, and 414 of the second set of axial grooves can be longer but shallower than the axial grooves 400, 402, 404, and 406 of the first set of axial grooves.

Notably, referring back to FIG. 3, while the distal ends of the axial grooves 400, 402, 404, and 406 of the first set of axial grooves are misaligned with respective distal ends of the axial grooves 408, 410, 412, and 414 of the second set of axial grooves (due to a difference between the lengths L1 and L2), all eight axial grooves are aligned at their proximal ends.

Particularly, the distal ends of the four axial grooves of the first set of axial grooves (e.g., the axial groove 406) are disposed at a distance E1 measured from a distal end 214 of the spool body 203. The distal ends of the four axial grooves of the second set of axial grooves (e.g., the axial grooves 412, 414) are disposed at a distance E2 measured from the distal end 214 of the spool body 203.

However, proximal ends of all eight axial grooves are disposed at a distance E3 measured from the distal end 214 of the spool body 203. The distance E1 is greater than E2 because the axial grooves of the first set of axial grooves (e.g., the axial groove 406) are shorter than axial grooves of the second set of axial grooves (e.g., the axial grooves 412, 414). With this configuration, the axial grooves can engage (i.e., allow fluid flow to) the return cavity 164 in a sequential manner when the spool 202 moves in a first axial direction (e.g., the distal direction) to retract the piston 114, while all the axial grooves engage the regulated flow passage 150 at the same time when the spool 202 moves in a second axial direction (e.g., the proximal direction) opposite the first axial direction to extend the piston 114.

Figure 7:
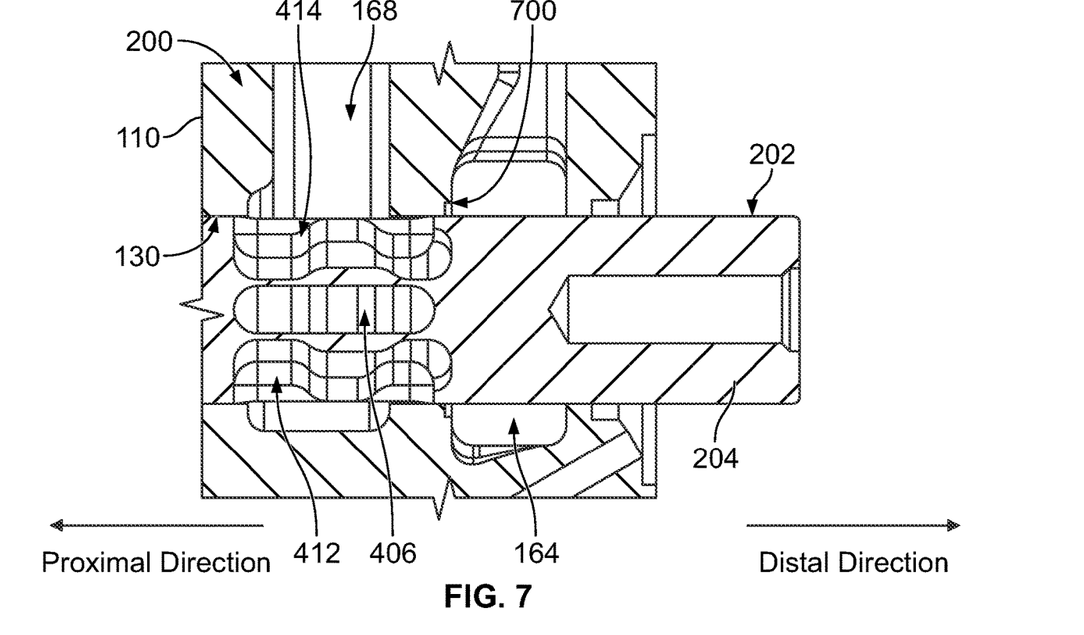
FIG. 7 illustrates a partial cross-sectional view of a worksection with a spool in a neutral position, in accordance with an example implementation.

FIGS. 7, 8, 9, and 10 illustrate sequential engagement of the axial grooves 400-414 with the return cavity 164 when the spool 202 moves in the distal direction, in accordance with an example implementation. Particularly, FIG. 7 illustrates a partial cross-sectional view of the worksection 200 with the spool 202 in a neutral position. At the neutral position of the spool 202 shown in FIG. 7, the land 204 blocks the workport passage 168 and prevent fluid flow to the return cavity 164 as none of the axial grooves 400-414 is exposed to or engaged with the return cavity 164. In other words, the workport passage 168 is fluidly decoupled from the return cavity 164 when the spool 202 is in the neutral position. The term "fluidly decoupled" is used herein to indicate that no substantial fluid flow (e.g., except for minimal leakage flow of drops per minute) occurs between two fluid passages or openings that are fluidly decoupled. Conversely, the term "fluidly coupled" indicates that fluid can flow or be communicated between two fluid passages or openings.

Figure 8:
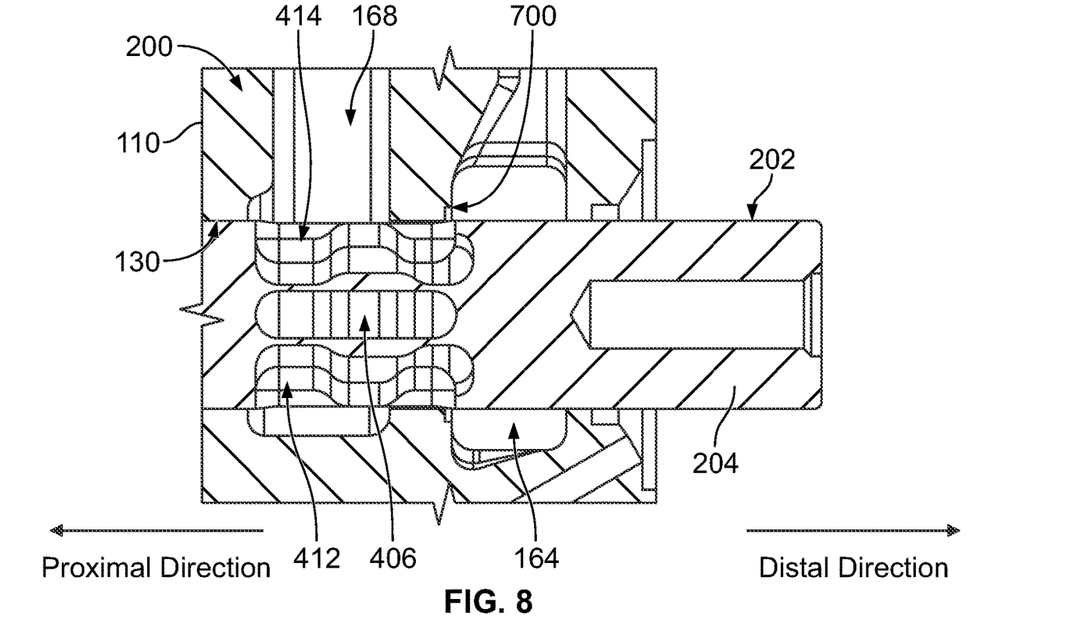
FIG. 8 illustrates a partial cross-sectional view of the worksection of FIG. 7 where the spool has moved axially in a distal direction through a first portion of its stroke to a first axial position, in accordance with an example implementation.

FIG. 8 illustrates a partial cross-sectional view of the worksection 200 where the spool 202 has moved axially in the distal direction through a first portion of its stroke to a first axial position. As the spool 202 moves in the distal direction to retract the piston 114, distal ends of the longer axial grooves of the second set of axial grooves (the axial grooves 412, 414) start to move past an edge 700 of the return cavity 164.

As such, the longer axial grooves of the second set of axial grooves (the axial grooves 412, 414) fluidly couple the workport passage 168 to the return cavity 164 and allow fluid flow from the workport passage 168 to the return cavity 164. However, at the first axial position of the spool 202, the shorter axial grooves of the first set of axial grooves (e.g., the axial groove 406) have not reached the edge 700 of the return cavity 164 and remain disengaged therefrom.

Thus, a limited amount of fluid flow is allowed through the second set of axial grooves (e.g., the axial grooves 412, 414) from the workport passage 168 to the return cavity 164. As a result, the flow forces acting on the spool 202 may be reduced compared to a configuration where all axial grooves engage at the same time.

Figure 9:
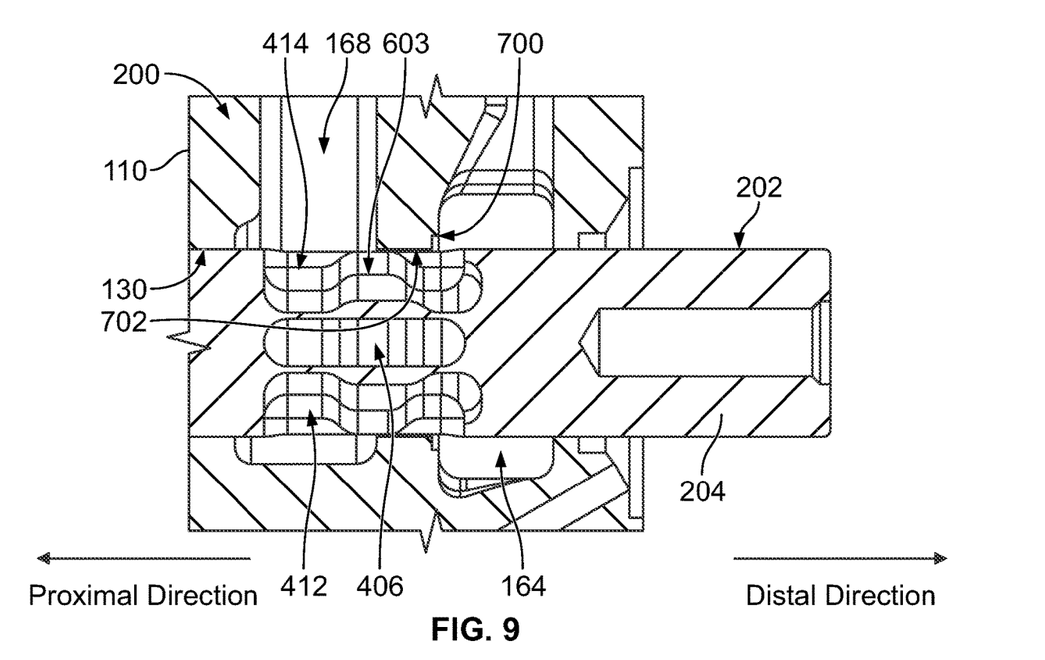
FIG. 9 illustrates a partial cross-sectional view of the worksection of FIG. 7 where the spool has moved axially in the distal direction through a second portion of its stroke to a second axial position, in accordance with an example implementation.

FIG. 9 illustrates a partial cross-sectional view of the worksection 200 where the spool 202 has moved axially in the distal direction through a second portion of its stroke to a second axial position. As the spool 202 moves further in the distal direction, distal ends of the shorter axial grooves of the first set of axial grooves (the axial groove 406) also move past an edge 700 of the return cavity 164. This way, the first set of axial grooves also fluidly couple the workport passage 168 to the return cavity 164, thereby increasing the fluid flow rate from the workport passage 168 to the return cavity 164.

However, such gradual increase in fluid flow rate by first engaging the second set of axial grooves then later engaging the first set of axial grooves may correspond to a gradual increase in the flow forces acting on the spool 202. In other words, a step-wise or sudden increase in the flow forces is avoided by sequentially engaging of the axial grooves, and thus the effect of flow forces on stability may be mitigated. Additionally, further movement of the spool 202 in the distal direction creates a flow restriction that may further enhance stability.

Figure 10:
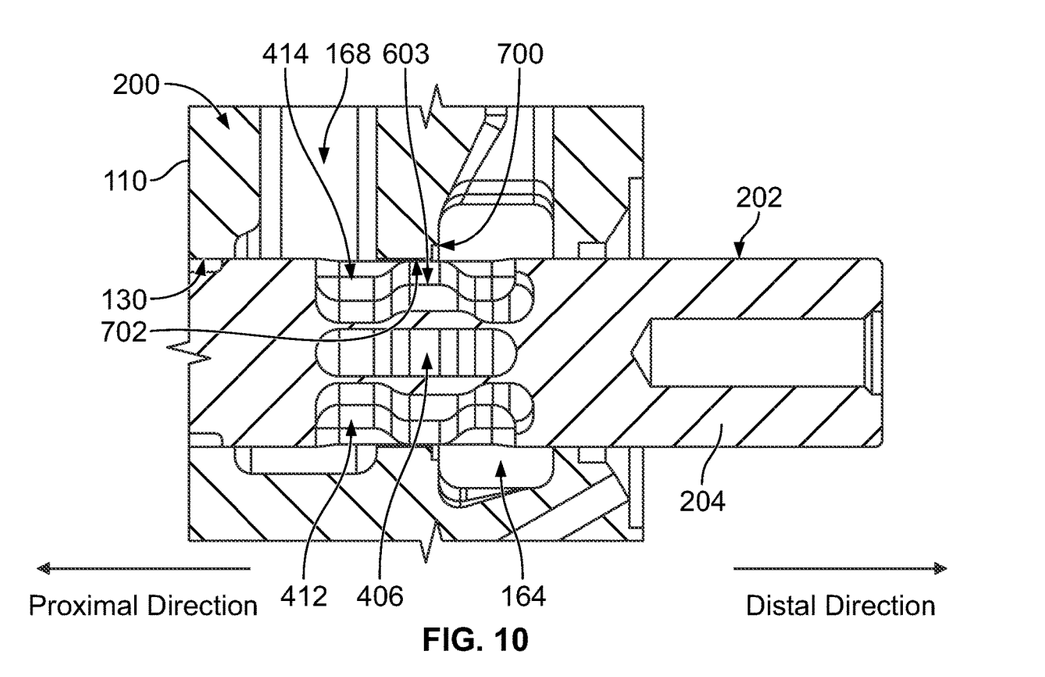
FIG. 10 illustrates a partial cross-sectional view of the worksection of FIG. 7 where the spool has moved axially in the distal direction through a third portion of its stroke to a third axial position, in accordance with an example implementation.

FIG. 10 illustrates a partial cross-sectional view of the worksection 200 where the spool 202 has moved axially in the distal direction through a third portion of its stroke to a third axial position. As the spool 202 moves further in the distal direction, the "bumps" of the axial grooves (e.g., the straight portion 603) overlaps an interior surface portion 702 of the worksection body 110, and a flow restriction is created therebetween.

The flow restriction can restrict fluid flow rate from the workport passage 168 to the return cavity 164, further enhancing stability. For example, a backpressure is generated in the workport passage 168 and the chamber 120 to prevent cavitation and retract the piston 114 in a controlled manner. Additionally, the flow restriction redirecting the flow forces in the desired direction, thereby mitigating the instability caused by Bernoulli flow forces.

Notably, the straight portion 603 can be shifted axially relative to the distal concave portion 600 and the proximal concave portion 602 (see FIG. 6) based on desired performance, and thus the spool configuration can be tuned specifically to a particular application.

With this configuration of the axial grooves in the land 204, the effect of flow forces on the spool 202 when the spool 202 moves in the distal direction to retract the piston 114 can be mitigated, and spool stability may be enhanced. Notably, the sequential engagement of the axial grooves and the flow restriction caused by the "bumps" in the axial grooves are pertinent to retraction of the piston 114 and movement of the spool 202 in the distal direction. However, they do not affect operation when the spool 202 moves in the proximal direction to extend the piston 114.

Referring to FIGS. 2-3 together, as mentioned above, the proximal ends of all eight axial grooves are axially aligned and are disposed at the distance E3 from the distal end 214 of the spool 202. Thus, when the spool 202 moves in the proximal direction to extend the piston 114, all eight axial grooves engage the regulated flow passage 150 at the same time to fluidly couple the regulated flow passage 150 to the workport passage 168.

Further, the "bumps" caused by the straight portions (e.g., straight portion 503, 603) do not cause flow restriction as is the case when the spool 202 moves in the distal direction. As such, the configuration of the spool 202 avoids the drawbacks of the orifice plate 172 which limits fluid flow in both directions.

It should be understood that the disclosed configuration of the spool 202 can be used as an alternative or in addition to using the orifice plate 172. In the case where both the spool 202 and the orifice plate 172 are used, a bigger hole 174 can be used (e.g., 0.75 inch rather than 0.5 inch) as the spool 202 enhances stability and a more restrictive orifice plate might not be needed.

FIG. 11 is a flowchart of a method 1100 for operating a worksection of a valve assembly, in accordance with an example implementation. The method 1100 can be used with the worksection 200 and the spool 202, for example.

The method 1100 may include one or more operations, functions, or actions as illustrated by one or more of blocks 1102-1106. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1102, the method 1100 includes positioning the spool 202 in the neutral position within the longitudinal bore 130 formed in the worksection 200 of a valve assembly, wherein the worksection 200 comprises the workport passage 168 fluidly coupled to the hydraulic actuator 104 and the return cavity 164 fluidly coupled to the fluid reservoir 108, wherein the spool 202 has the land 204 configured to control fluid flow from the workport passage 168 to the return cavity 164, wherein the land 204 comprises the plurality of axial grooves 212 formed in a circular array about a circumference of the land 204, wherein the plurality of axial grooves 212 comprises the first set of axial grooves (i.e., the axial grooves 400-406) and the second set of axial grooves (i.e., the axial grooves 408-414), wherein an axial length of the axial grooves of the second set of axial grooves is greater than a respective axial length of the axial grooves of the first set of axial grooves, and wherein in the neutral position of the spool 202, the plurality of axial grooves 212 are disengaged from the return cavity 164 and the land 204 fluidly decouples the workport passage 168 from the return cavity 164 (see FIG. 7).

At block 1104, the method 1100 includes moving the spool 202 to a first axial position (see FIG. 8), wherein at the first axial position of the spool, the axial grooves of the second set of axial grooves engage the return cavity 164, thereby fluidly coupling the workport passage 168 to the return cavity 164, whereas the axial grooves of the first set of axial grooves remain disengaged from the return cavity 164.

At block 1106, the method 1100 includes moving the spool 202 to a second axial position (see FIG. 9), wherein at the second axial position of the spool 202, the axial grooves of the first set of axial grooves engage the return cavity 164 such that both the first set of axial grooves and the second set of axial grooves fluidly couple the workport passage 168 to the return cavity 164.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A spool configured to be movable in a worksection of a valve assembly, the spool comprising:
    a spool body varying in diameter along a length of the spool body, thereby forming a plurality of lands of variable diameters, wherein a land of the plurality of lands is configured to control fluid flow from a workport passage formed in the worksection to a return cavity formed in the worksection; and
    a plurality of axial grooves formed in a circular array about a circumference of the land, wherein the plurality of axial grooves comprises a first set of axial grooves and a second set of axial grooves, wherein an axial length of axial grooves of the second set of axial grooves is greater than a respective axial length of axial grooves of the first set of axial grooves, allowing the axial grooves of the second set of axial grooves to engage the return cavity before the axial grooves of the first set of axial grooves when the spool is shifted within the worksection in a distal axial direction, wherein a depth of the axial grooves of the second set of axial grooves is smaller than a respective depth of the axial grooves of the first set of axial grooves such that the axial grooves of the second set of axial grooves are shallower than the axial grooves of the first set of axial grooves, and wherein the axial grooves of the first set of axial grooves are interleaved with the axial grooves of the second set of axial grooves, such that each axial groove the first set of axial grooves is circumferentially-interposed between two adjacent axial grooves of the second set of axial grooves, and each axial groove the second set of axial grooves is circumferentially-interposed between two adjacent axial grooves of the first set of axial grooves.

2. The spool of claim 1, wherein proximal ends of both the first set of axial grooves and the second set of axial grooves are aligned, wherein distal ends of the first set of axial grooves are misaligned with respective distal ends of the second set of axial grooves due to a difference in length therebetween.

3. The spool of claim 1, wherein an axial groove of the first set of axial grooves or the second set of axial grooves comprises:
   a distal concave portion having a first depth from a surface of the land;
   a proximal concave portion having a second depth from the surface of the land; and
   a flat portion separating the distal concave portion and the proximal concave portion and having a third depth from the surface of the land.

4. The spool of claim 3, wherein the first depth is equal to the second depth.

5. The spool of claim 3, wherein the third depth is smaller than the first depth and the second depth such that the axial groove is shallower at the flat portion compared to the distal concave portion and the proximal concave portion.

6. A worksection of a valve assembly, the worksection comprising:
   a worksection body having (i) a longitudinal bore, (ii) a workport passage configured to be fluidly coupled to a hydraulic actuator, and (iii) a return cavity configured to be fluidly coupled to a fluid reservoir; and
   a spool axially movable in the longitudinal bore to shift from a neutral position to a first axial position and a second axial position, wherein the spool comprises:
      a spool body varying in diameter along a length of the spool body, thereby form a plurality of lands of variable diameters, wherein a land of the plurality of lands is configured to control fluid flow from the workport passage to the return cavity, wherein the land fluidly decouples the workport passage from the return cavity when the spool is in the neutral position, and
      a plurality of axial grooves formed in a circular array about a circumference of the land, wherein the plurality of axial grooves comprises a first set of axial grooves and a second set of axial grooves, wherein an axial length of axial grooves of the second set of axial grooves is greater than a respective axial length of axial grooves of the first set of axial grooves, allowing the axial grooves of the second set of axial grooves to engage the return cavity to fluidly couple the workport passage to the return cavity while the axial grooves of the first set of axial grooves remain disengaged from the return cavity when the spool is shifted to the first axial position, wherein at the second axial position of the spool, both the first set of axial grooves and the second set of axial grooves fluidly couple the workport passage to the return cavity, wherein a depth of the axial grooves of the second set of axial grooves is smaller than a respective depth of the axial grooves of the first set of axial grooves such that the axial grooves of the second set of axial grooves are shallower than the axial grooves of the first set of axial grooves, and wherein the axial grooves of the first set of axial grooves are interleaved with the axial grooves of the second set of axial grooves, such that each axial groove the first set of axial grooves is circumferentially-interposed between two adjacent axial grooves of the second set of axial grooves, and each axial groove the second set of axial grooves is circumferentially-interposed between two adjacent axial grooves of the first set of axial grooves.

7. The worksection of claim 6, wherein proximal ends of both the first set of axial grooves and the second set of axial grooves are aligned, wherein distal ends of the first set of axial grooves are misaligned with respective distal ends of the second set of axial grooves due to a difference in length therebetween.

8. The worksection of claim 6, wherein an axial groove of the first set of axial grooves or the second set of axial grooves comprises:
   a distal concave portion having a first depth from a surface of the land;
   a proximal concave portion having a second depth from the surface of the land; and
   a flat portion separating the distal concave portion and the proximal concave portion and having a third depth from the surface of the land.

9. The worksection of claim 8, wherein the first depth is equal to the second depth.

10. The worksection of claim 8, wherein the third depth is smaller than the first depth and the second depth such that the axial groove is shallower at the flat portion compared to the distal concave portion and the proximal concave portion.

11. A hydraulic system comprising:
   a source of fluid;
   a fluid reservoir;
   a hydraulic actuator having a chamber therein; and
   a valve assembly comprising a worksection controlling fluid flow to and from the chamber of the hydraulic actuator, wherein the worksection comprises:
      a worksection body having: (i) a longitudinal bore, (ii) a workport passage fluidly coupled to the chamber of the hydraulic actuator, (iii) a return cavity fluidly coupled to the fluid reservoir, (iv) an inlet cavity fluidly coupled to the source of fluid and (ii) a flow passage configured to receive fluid from the inlet cavity, and
      a spool axially movable in the longitudinal bore to shift in a distal direction from a neutral position to a first axial position and a second axial position, wherein the spool comprises:
         a spool body varying in diameter along a length of the spool body, thereby form a plurality of lands of variable diameters, wherein a land of the plurality of lands controls fluid flow from the workport passage to the return cavity, wherein the land fluidly decouples the workport passage from the return cavity when the spool is in the neutral position, wherein the land further controls fluid flow from the flow passage to the workport passage, wherein the land fluidly decouples the workport passage from the flow passage when the spool is in the neutral position, and
         a plurality of axial grooves formed in a circular array about a circumference of the land, wherein the plurality of axial grooves comprises a first set of axial grooves and a second set of axial grooves, wherein an axial length of axial grooves of the second set of axial grooves is greater than a respective axial length of axial grooves of the first set of axial grooves, allowing the axial grooves of the second set of axial grooves to engage the return cavity to fluidly couple the workport passage to the return cavity while the axial grooves of the first set of axial grooves remain disengaged from the return cavity when the spool is shifted to the first axial position, wherein at the second axial position of the spool, both the first set of axial grooves and the second set of axial grooves fluidly couple the workport passage to the return cavity, wherein distal ends of the first set of axial grooves are misaligned with respective distal ends of the second set of axial grooves due to a difference in length therebetween, wherein proximal ends of both the first set of axial grooves and the second set of axial grooves are aligned such that when the spool shifts in a proximal direction, both the first set of axial grooves and the second set of axial grooves engage the flow passage at the same time to fluidly couple the flow passage to the workport passage.

12. The hydraulic system of claim 11, wherein a depth of the axial grooves of the second set of axial grooves is smaller than a respective depth of the axial grooves of the first set of axial grooves such that the axial grooves of the second set of axial grooves are shallower than the axial grooves of the first set of axial grooves.

13. The hydraulic system of claim 11, wherein the axial grooves of the first set of axial grooves are interleaved with the axial grooves of the second set of axial grooves, such that each axial groove the first set of axial grooves is circumferentially-interposed between two axial grooves of the second set of axial grooves.

14. The hydraulic system of claim 11, wherein an axial groove of the first set of axial grooves or the second set of axial grooves comprises:
 a distal concave portion having a first depth from a surface of the land;
 a proximal concave portion having a second depth from the surface of the land; and
 a flat portion separating the distal concave portion and the proximal concave portion and having a third depth from the surface of the land.

15. The hydraulic system of claim 14, wherein the first depth is equal to the second depth, and wherein the third depth is smaller than the first depth and the second depth such that the axial groove is shallower at the flat portion compared to the distal concave portion and the proximal concave portion.

* * * * *